(12) United States Patent
Pevida

(10) Patent No.: US 12,139,258 B2
(45) Date of Patent: Nov. 12, 2024

(54) SEAT SYSTEM HAVING A SOLENOID-ACTUATED RECLINE LEVER

(71) Applicant: HAECO Americas, LLC, Greensboro, NC (US)

(72) Inventor: Jose Pevida, Greensboro, NC (US)

(73) Assignee: ZIM IP AMERICA INC., Dover, DE (US)

( * ) Notice: Subject to any disclaimer, the term of this patent is extended or adjusted under 35 U.S.C. 154(b) by 161 days.

(21) Appl. No.: 17/599,583

(22) PCT Filed: Mar. 31, 2020

(86) PCT No.: PCT/US2020/025953
§ 371 (c)(1),
(2) Date: Sep. 29, 2021

(87) PCT Pub. No.: WO2020/205858
PCT Pub. Date: Oct. 8, 2020

(65) Prior Publication Data
US 2022/0194595 A1   Jun. 23, 2022

Related U.S. Application Data

(60) Provisional application No. 62/827,570, filed on Apr. 1, 2019.

(51) Int. Cl.
B64D 11/06   (2006.01)
B64D 11/00   (2006.01)

(52) U.S. Cl.
CPC .... *B64D 11/06395* (2014.12); *B64D 11/0638* (2014.12); *B64D 11/064* (2014.12); *B64D 11/0642* (2014.12); *B64D 11/00151* (2014.12)

(58) Field of Classification Search
CPC ........... B64D 11/06395; B64D 11/064; B64D 11/0638; B64D 11/0642
See application file for complete search history.

(56) References Cited

U.S. PATENT DOCUMENTS

| | | |
|---|---|---|
| 5,002,172 A | 3/1991 | Stringer |
| 8,052,112 B2 | 11/2011 | Lawall et al. |
| 8,727,441 B1 | 5/2014 | Giasson et al. |
| 8,948,962 B2 | 2/2015 | Pywell et al. |
| 8,974,000 B2 | 3/2015 | Navatte et al. |
| 8,979,194 B2 | 3/2015 | Boomgarden et al. |
| 2016/0159481 A1* | 6/2016 | Gianakopoulos .... B64D 11/064 297/217.3 |

* cited by examiner

Primary Examiner — Anthony D Barfield
(74) Attorney, Agent, or Firm — MacCord Mason PLLC

(57) ABSTRACT

A seat system for a passenger aircraft. The seat system includes a passenger seat frame having a backrest support assembly including a backrest and a spreaders and spar tube assembly; and a seat bottom support assembly. The seat system further includes a solenoid-actuated recline lever assembly including an armrest or center console connected to the spreaders and spar tube assembly; a counter-balanced solenoid actuator positioned in the seat bottom support assembly; and a passenger operated release switch attached between the solenoid actuator and the armrest or center console. The seat system may further include a seat back tray table attached to the back of the passenger seat frame.

20 Claims, 8 Drawing Sheets

SEAT SYSTEM HAVING A SOLENOID-ACTUATED RECLINE LEVER

REFERENCE TO PRIOR APPLICATIONS

This application claims the benefit of PCT Application No. 20/025953, filed Mar. 31, 2020, which claims be benefit of U.S. Provisional Application No. 62/827,570, filed Apr. 1, 2019, and are hereby incorporated by reference in their entireties.

BACKGROUND OF THE INVENTIONS

(1) Field

The present inventions relate generally to seat systems for passenger vehicles and, more particularly, to a seat system for a passenger aircraft.

(2) Related Art

Most commercial aircraft passenger seats are designed to recline several inches from the full upright position for passenger comfort. Traditionally, seat back recline is accomplished by a spring-loaded hydraulic device known as a "recline lock". The recline lock is controlled by a shielded release switch connected to a mechanical push button, which is usually mounted on a seat armrest.

To recline the seat, the passenger presses the button and leans back on the seat. The button pulls the release switch, which actuates a lever at the other end that opens the hydraulic valve in the recline lock, allowing it to compress and thus allow the seat to recline.

If the passenger wants to return the seatback to the upright position, he or she again presses the button and leans forward. The valve on the recline lock will again be opened, allowing the internal spring to expand the recline lock and move the seatback forward.

One example of such purely mechanical seat recline controls is shown in U.S. Pat. No. 7,182,402 issued Feb. 27, 2007 to Ahad which is hereby incorporated by reference in its entirety. One example of a seat recline locking assembly is shown in U.S. Pat. No. 6,669,295 issued Dec. 30, 2003 to Williamson which is hereby incorporated by reference in its entirety. Another example of a seat recline locking assembly is shown in U.S. Pat. No. 3,145,052 issued Jan. 24, 1963 to Morgan which also is hereby incorporated by reference in its entirety.

The air travel industry is highly price competitive and has generally divided its passengers into First Class, Business Class and Coach. More recently, as the air travel industry has further expanded its Business class, it has worked with its manufacturers to provide amenities to Business class that were normally only found in First class. However, non-mechanical seat recline mechanisms such as normally used in First class are heavy, motored arrangements to provide durability over the projected long life of the interior.

One example of a hybrid electro-mechanical latch mechanism which is directed to a touch sensitive control for a seat latch mechanism is shown in U.S. Pat. No. 8,948,962 issued Feb. 3, 2015 to Pywell et al. which is hereby incorporated by reference in its entirety.

Thus, there remains a need for a seat system having an improved solenoid-actuated recline lever assembly which is both lightweight and durable while, at the same times, remains easy for all passengers to operate.

SUMMARY OF THE INVENTIONS

The present inventions are directed to a seat system for a passenger aircraft. The seat system includes a passenger seat frame having a backrest support assembly including a backrest and a spreaders and spar tube assembly; and a seat bottom support assembly. The seat system further includes a solenoid-actuated recline lever assembly including an armrest or center console connected to the spreaders and spar tube assembly; a counter-balanced solenoid actuator positioned in the seat bottom support assembly; and a release switch attached between the solenoid actuator and the armrest or center console. The seat system may further include a seat back tray table attached to the back of the passenger seat frame.

The seat back tray table attached to the back of the passenger seat frame may be movable between a first storage position and a second deployed position. In one embodiment, a lock mechanism is attached to the back of the passenger seat frame for retaining the seat back tray table in a secured position.

In one embodiment, the passenger seat further includes a display attached to the back of the passenger seat. The display may be adjoined by the back of the passenger seat.

A backrest cushion may be attached to the backrest support assembly. The backrest support assembly may further include a headrest. In one embodiment, the headrest is adjustable to accommodate for the height of a passenger.

The passenger seat may further include an upholstered package. In addition, the passenger seat may further include a trim package.

Accordingly, one aspect of the present inventions is to provide a seat system for a passenger aircraft, the seat system including (a) a passenger seat frame having a backrest support assembly including a backrest and a spreaders and spar tube assembly; and a seat bottom support assembly; and (b) a solenoid-actuated recline lever assembly including an armrest or center console connected to the spreaders and spar tube assembly; a solenoid actuator positioned in the seat bottom support assembly; and a release switch attached between the solenoid actuator and the armrest or center console.

Another aspect of the present inventions is to provide in a seat system for a passenger aircraft wherein the seat system includes a passenger seat frame having a backrest support assembly including a backrest and a spreaders and spar tube assembly and a seat bottom support assembly, the improvement comprising a solenoid-actuated recline lever assembly, the solenoid-actuated recline lever assembly including an armrest or center console connected to the spreaders and spar tube assembly; a counter-balanced solenoid actuator positioned in the seat bottom support assembly; and a passenger operated release switch attached between the solenoid actuator and the armrest or center console.

Still another aspect of the present inventions is to provide a seat system for a passenger aircraft, the seat system including (a) a passenger seat frame having a backrest support assembly including a backrest and a spreaders and spar tube assembly; and a seat bottom support assembly; (b) a solenoid-actuated recline lever assembly including an armrest or center console connected to the spreaders and spar tube assembly; a counter-balanced solenoid actuator positioned in the seat bottom support assembly; and a passenger operated release switch attached between the solenoid actuator and the armrest or center console; and (c) a seat back tray table attached to the back of the passenger seat frame.

These and other aspects of the present inventions will become apparent to those skilled in the art after a reading of the following description of the preferred embodiment when considered with the drawings.

DESCRIPTION OF THE EMBODIMENTS

Figure 1:
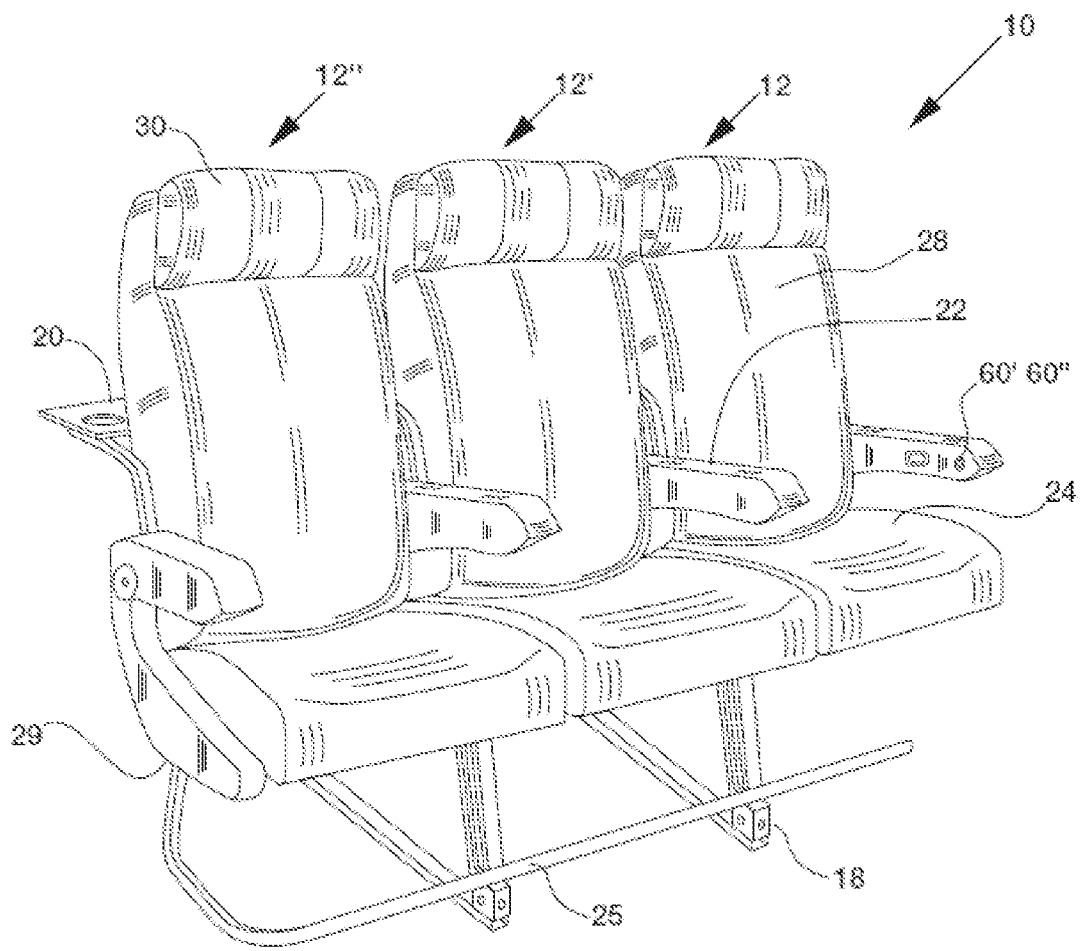
FIG. 1 is a front perspective view of one embodiment of a seat system having a solenoid recline lever constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the inventions and are not intended to limit the inventions thereto. As best seen in FIG. 1, a seat system, generally designated 10, is shown constructed according to the present inventions. The seat system 10 includes at least one passenger seat 12 having a seat back 28 and a recline lever assembly 40 (see below) for selectively reclining the seat back.

The seat 12 includes a seat base frame 18, a baggage bar 25 for retaining baggage below the seat base frame 18 and an armrest 22 or center console. The seating apparatus 10 may further include a seat back tray table 20 attached to the seat back 28. See FIG. 5 below which shows the solenoid actuator 46 for controlling the seat recline control device attached to the backrest support assembly 26.

Figure 2:
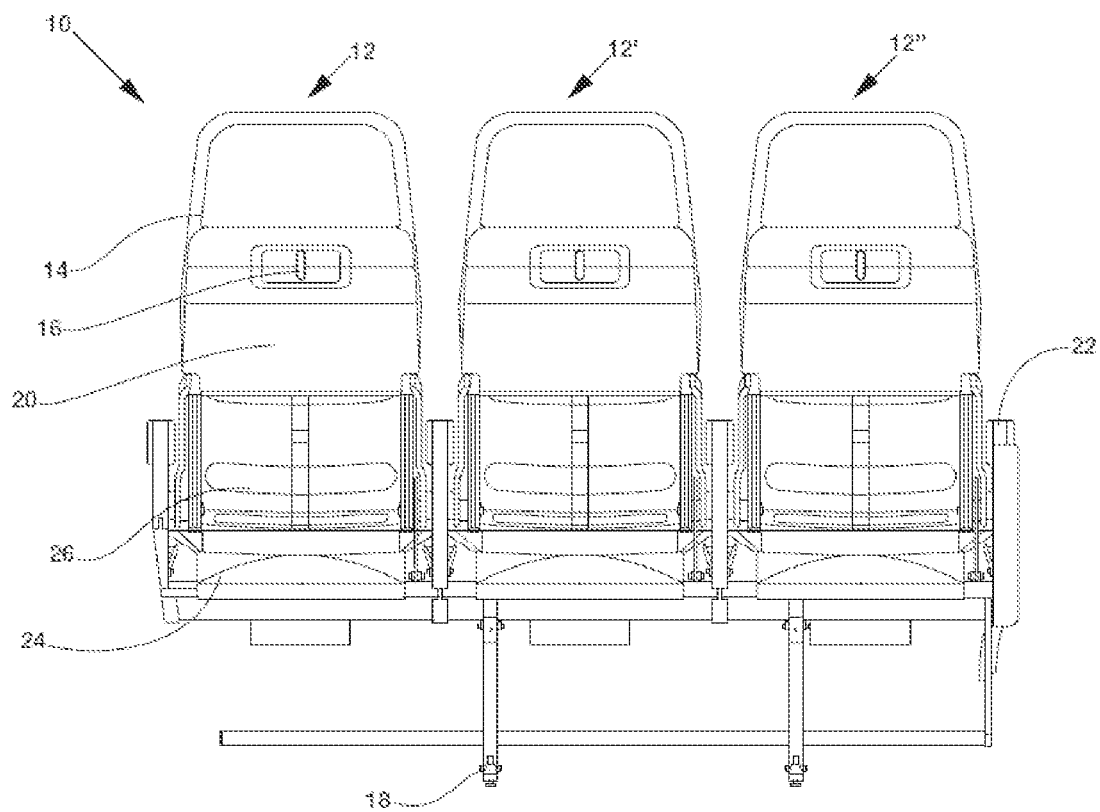
FIG. 2 is a rear elevation view of the seat system shown in FIG. 1.

Turning to FIG. 2, there is shown a rear elevation view of the seat system 10 shown in FIG. 1. Each of the passenger seats 12 include a seat bottom support assembly 24 attached to the seat base frame 18 and also a backrest support assembly 26 attached to the seat base frame 18 adjoining the seat bottom support assembly 24.

The backrest support assembly 26 may further include a headrest 30. In one embodiment headrest 30 is adjustable to accommodate the height of a passenger. The backrest support assembly 26 includes a backrest 28 that may tilt with respect to spreaders and spar tube assembly 29 and armrest 22 or center console.

A seat back bezel 14 may be attached to the back of the passenger seat 12. The seat back bezel 14 may adjoin a seat back tray table 20 attached to the back of passenger seat 12.

Figure 3:
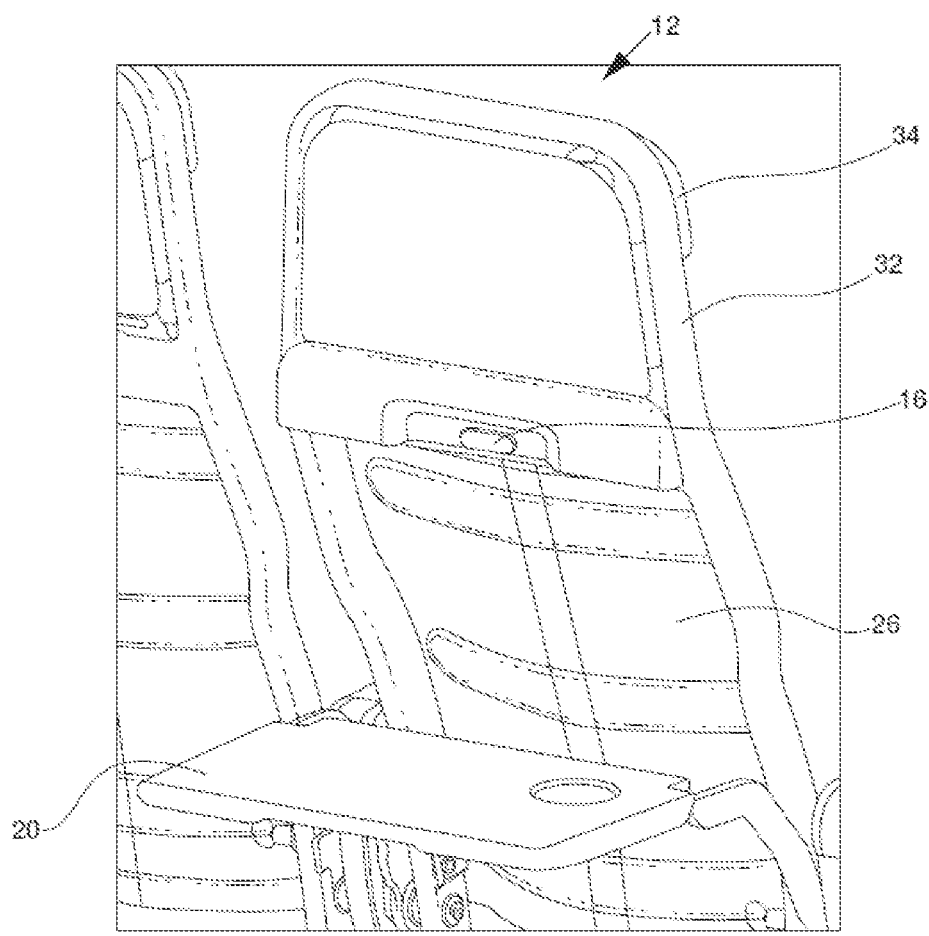
FIG. 3 is an enlarged back perspective view of FIG. 2 with the seat back tray deployed.

As best seen in FIG. 3, the seat back tray table 20 attached to the back of the passenger seat 12 is movable between its first storage position and a second deployed position. A lock mechanism 16 attached to the back of the seat back bezel 14 is adapted to retain the seat back tray table 20 in its secured position.

The passenger seat 12 normally has a headrest closeout panel such as shown in FIGS. 2 and 3 but other embodiments may further include a display attached to the back of the passenger seat 12. The display may adjoin the seat back bezel 14. The passenger seat 12 may further include an upholstery package generally designated 32 and may also include a trim package generally designated 34.

Figure 4:
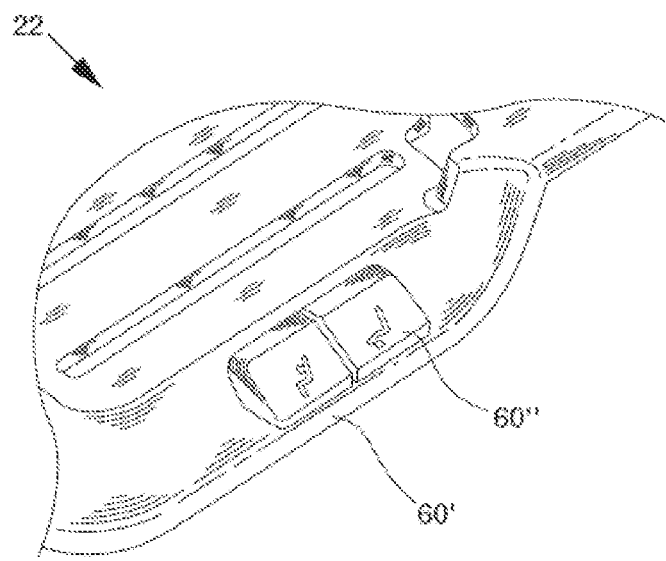
FIG. 4 is an enlarged perspective view of the armrest or center console passenger operated release switches for the solenoid-actuated recline lever assembly housed in a seat bottom support assembly.

Turning now to FIG. 4, there is shown an enlarged perspective view of the of the armrest 22 or center console passenger operated release switches 60', 60" for solenoid-actuated recline lever assembly 40 housed in the seat bottom support assembly 24. One type of passenger operated release switch may be use is a touch metal switch, also known as piezo touch switches. These are available from several sources including Barantec, Inc. of Clifton, NJ. The armrest 22 may include a lower body 42 and an arm cap 44. In one embodiment, the lower portion of the arm cap 44 interlocks with the upper portion of the lower body 42. In another embodiment, the arm cap 44 is removably attached to the upper portion of the lower body 42 by a hidden fastener for easy access if maintenance is required.

Figure 5:
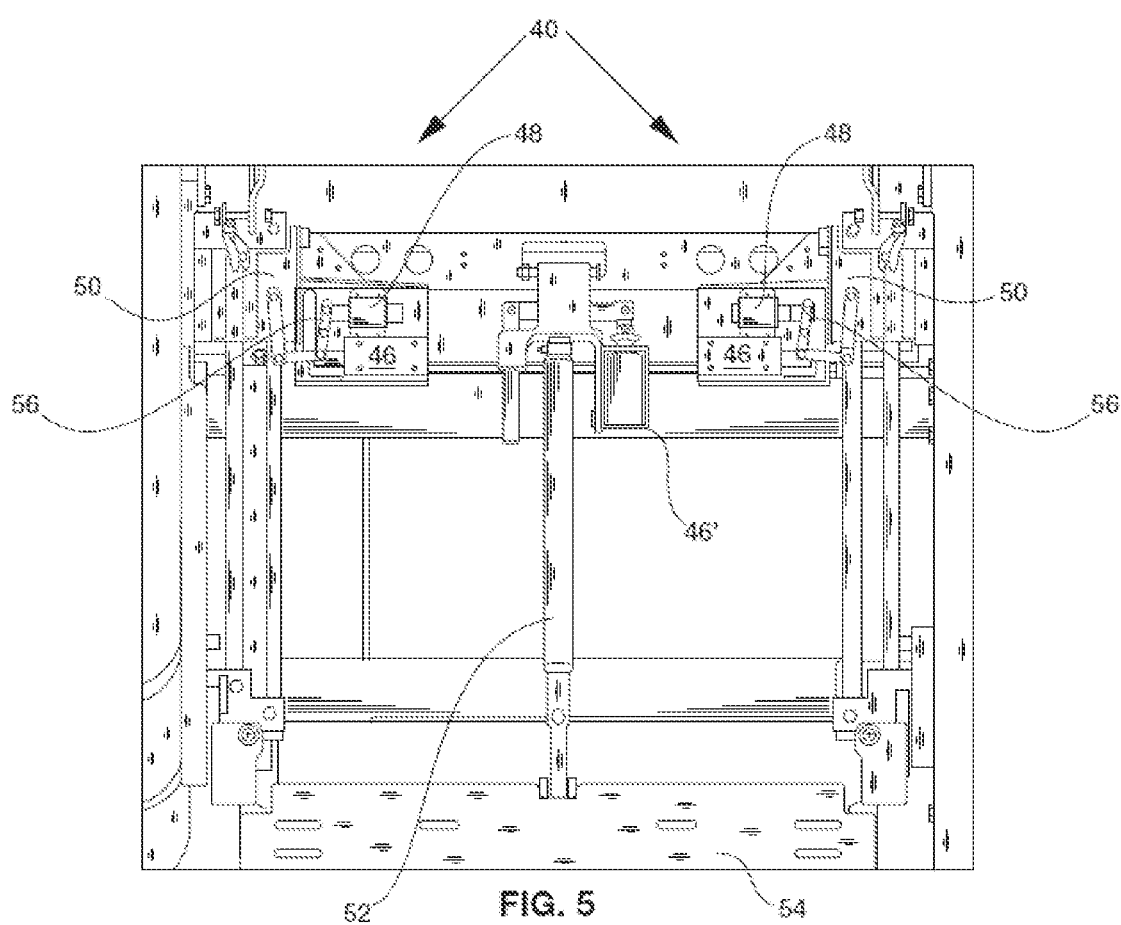
FIG. 5 is a top plan view of one embodiment of a counter-balanced solenoid actuator for the solenoid-actuated recline lever assembly housed in a seat bottom support assembly in its neutral position.

FIG. 5 is a top plan view of one embodiment of a counter-balance 48 for a solenoid actuator 46 for the solenoid-actuated recline lever assembly 40 housed in a seat bottom support assembly 24 in its neutral position. In operation, the passenger presses the switch 60' shown on FIG. 4 to recline the seat. The solenoids 46 actuate using arm 56 and in one embodiment counter-balance 48 to free the mechanical locks 50. Now that the mechanical locks 50 located at both ends of the seat pan are unlocked, the seat bottom is free to move forward and the seat back can recline as well.

As can also be seen, the mechanism 46' is adaptable for the leg rest release too. In that case, the passenger presses the switch 60" for leg rest actuation as shown on FIG. 4. The solenoid 46' located in the center of FIG. 5 actuates to release gas spring 52 which actuates leg rest plate 54 forward.

Figure 6:
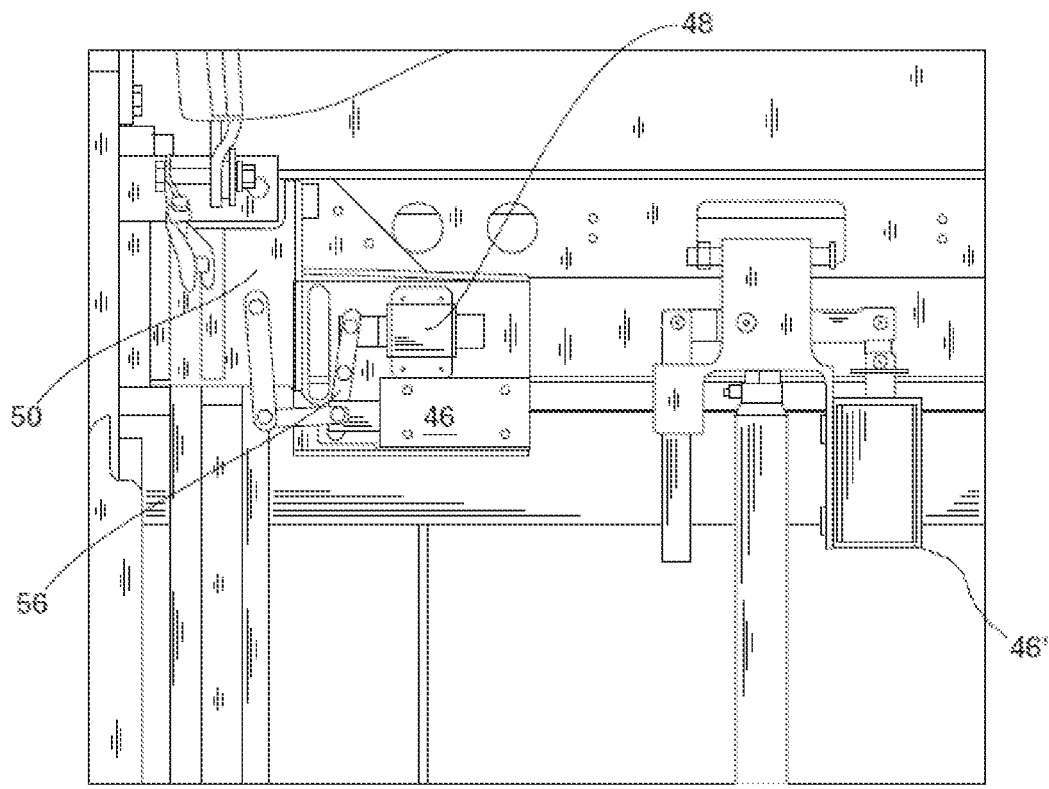
FIG. 6 is an enlarged top plan view of the counter-balanced solenoid actuator for the solenoid-actuated recline lever assembly shown in FIG. 5.

FIG. 6 is an enlarged top plan view of the counter-balanced solenoid actuator 46 for the solenoid-actuated recline lever assembly 40 shown in FIG. 5. This represents a more detailed view of the mechanism associated with solenoid 46 and counter-balance 48 in one embodiment and mechanical lock device 50 for solenoid-actuated recline lever assembly 40.

Figure 7:
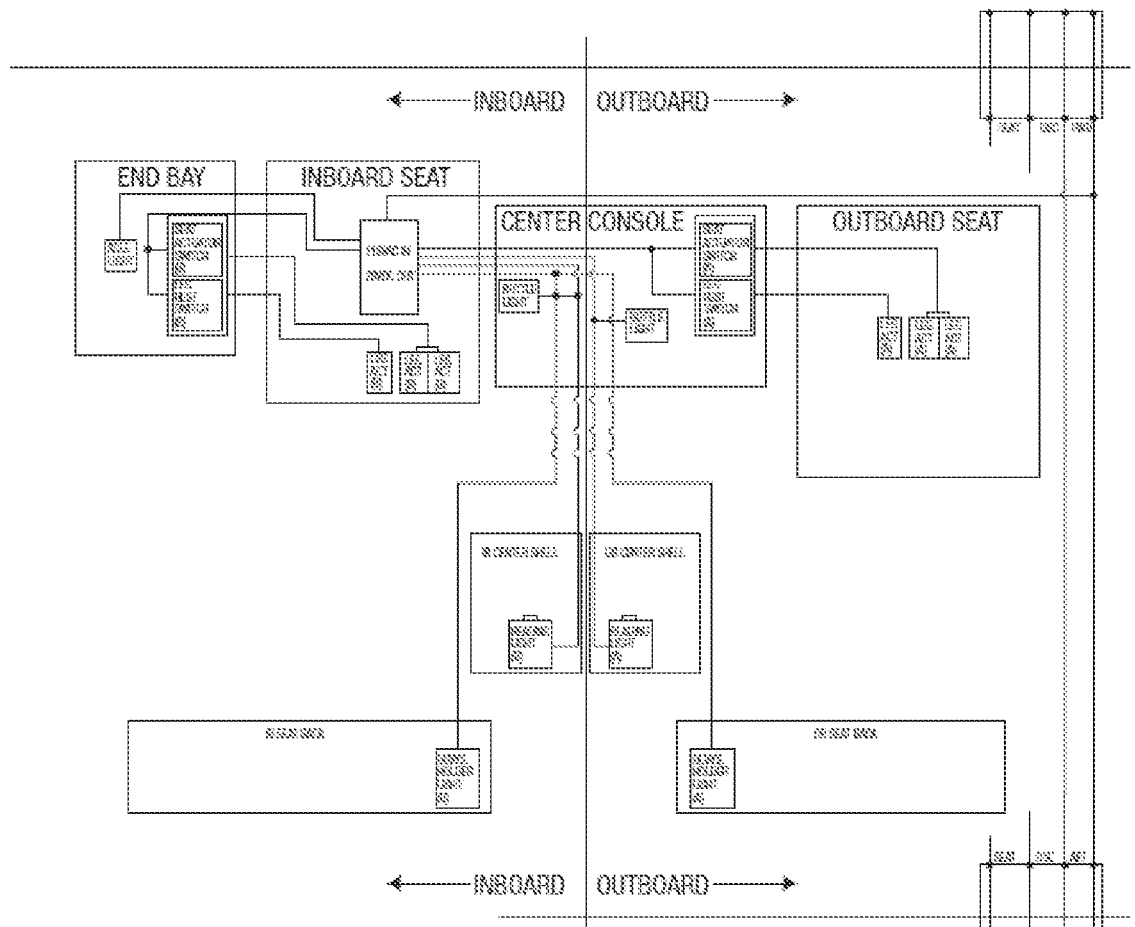
FIG. 7 is an example of a simplified electrical wiring diagram for one embodiment of the solenoid-actuated recline lever assembly housed in a seat bottom support assembly illustrating its interconnections between the passenger operated release switches and the solenoids.

FIG. 7 is an example of a simplified electrical wiring diagram for one embodiment of the solenoid-actuated recline lever assembly housed in a seat bottom support assembly illustrating its interconnections between the passenger operated release switches and the solenoids. FIG. 7 shows a typical full electrical actuation system diagram of which the electro-mechanical system of the present inventions is a part.

Figure 8:
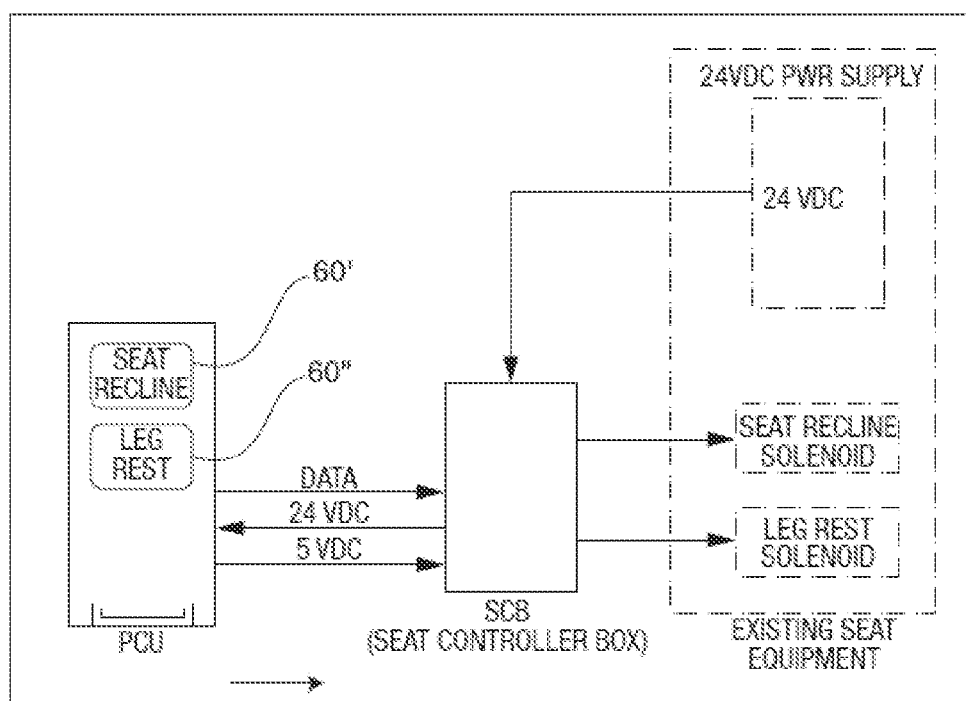
FIG. 8 illustrates a more detailed simplified electrical wiring diagram of the electro-mechanical control of the seat articulations.

Turning finally to FIG. 8, there is shown an example of a more detailed simplified electrical wiring diagram of the electro-mechanical control of the seat articulations. The passenger control unit (PCU) located in the seat armrest or center console including passenger operated release switches 60' and 60" have an electrical interface with either seat recline solenoids 46 or leg rest solenoid 46' to allow different movements of the seat mechanism. Aircraft electrical power comes into seat controller box and then it is distributed to power both the PCU and switches 60' and 60" as well as solenoids 46 and 46', Certain modifications and improvements will occur to those skilled in the art upon a reading of the foregoing description. By way of example, the solenoid-actuated recline lever assembly disclosed herein may release the leg rest as well as the seat back. Also, the passenger operated release switches may be flipped in order to be in one armrest or the other or center console. It should be understood that all such modifications and improvements have been deleted herein for the sake of conciseness and readability but are properly within the scope of the following claims.

We claim:

1. A seat system for a passenger aircraft, said seat system comprising:
   (a) a passenger seat frame having
      (i) a backrest support assembly including a backrest and a spreaders and spar tube assembly and a backrest cushion; and
      (ii) a seat bottom support assembly; and
   (b) a solenoid-actuated recline lever assembly including
      (i) an armrest or center console connected to said spreaders and spar tube assembly;
      (ii) a solenoid actuator positioned in said seat bottom support assembly; and
      (iii) a touch sensitive release piezo electrical switch attached between said solenoid actuator and said armrest or center console and adapted to control mechanical actuation of said passenger seat frame.

2. The seat system according to claim 1, including a seat back tray table attached to the back of said passenger seat frame and adapted to be movable between a first storage position and a second deployed position.

3. The seat system according to claim 2, including a lock mechanism attached to the back of said passenger seat frame for retaining said seat back tray table in a secured position.

4. The seat system according to claim 1, wherein said armrest includes a lower body and an arm cap.

5. The seat system according to claim 4, wherein said lower portion of said arm cap interlocks with the upper portion of said lower body.

6. In a seat system for a passenger aircraft wherein the seat system includes a passenger seat frame having (i) a backrest support assembly including a backrest and a spreaders and spar tube assembly and a backrest cushion and (ii) a seat bottom support assembly, the improvement comprising a solenoid-actuated recline lever assembly, said solenoid-actuated recline lever assembly comprising:
   (a) an armrest or center console connected to said spreaders and spar tube assembly;
   (b) a counter-balanced solenoid actuator positioned in said seat bottom support assembly; and
   (c) a touch sensitive release piezo electrical switch attached between said solenoid actuator and said armrest or center console and adapted to control mechanical actuation of said passenger seat frame.

7. The solenoid-actuated recline lever assembly according to claim 6, wherein said armrest includes a lower body and an arm cap.

8. The solenoid-actuated recline lever assembly of claim 7, wherein said lower portion of said arm cap interlocks with said upper portion of said lower body.

9. The solenoid-actuated recline lever assembly of claim 8, wherein said arm cap is removably attached to the upper portion of said lower body by a fastener.

10. A seat system for a passenger aircraft, said seat system comprising:
    (a) a passenger seat frame having
       (i) a backrest support assembly including a backrest and a spreaders and spar tube assembly and a backrest cushion; and
       (ii) a seat bottom support assembly;
    (b) a solenoid-actuated recline lever assembly including
       (i) an armrest or center console connected to said spreaders and spar tube assembly;
       (ii) a counter-balanced solenoid actuator positioned in said seat bottom support assembly; and
       (iii) a touch sensitive release piezo electrical switch attached between said solenoid actuator and said armrest or center console; and
    (c) a seat back tray table attached to the back of said passenger seat frame.

11. The seat system according to claim 10, wherein said seat back tray table attached to the back of said passenger seat frame is movable between a first storage position and a second deployed position.

12. The seat system according to claim 11, including a lock mechanism attached to the back of said passenger seat frame for retaining said seat back tray table in a secured position.

13. The seat system according to claim 10, including a display attached to the back of said passenger seat frame.

14. The seat system according to claim 13, wherein said display is adjoined by the back of said passenger seat frame.

15. The seat system according to claim 10, including a headrest being adjustable to accommodate for the height of a passenger.

16. The seat system according to claim 10, wherein said passenger seat frame includes an upholstered package.

17. The seat system according to claim 10, wherein said passenger seat includes a trim package.

18. The seat system according to claim 10, wherein said armrest includes a lower body and an arm cap.

19. The seat system of claim 18, wherein the lower portion of said arm cap interlocks with the upper portion of said lower body.

20. The seat system of claim 19, wherein the said arm cap is removably attached to the upper portion of said lower body by a fastener.

* * * * *